United States Patent [19]

Charpak et al.

[11] 4,376,892

[45] Mar. 15, 1983

[54] DETECTION AND IMAGING OF THE SPATIAL DISTRIBUTION OF VISIBLE OR ULTRAVIOLET PHOTONS

[75] Inventors: Georges Charpak, Paris; N'Guyen N. Hoan, Verrieres-le-Buisson, both of France; Armando Policarpo, Coimbra, Portugal; Fabio Sauli, Geneva, Switzerland

[73] Assignee: Agence Nationale de Valorisation de la Recherche (ANVAR), France

[21] Appl. No.: 197,611

[22] Filed: Oct. 16, 1980

[51] Int. Cl.[3] .......................... G01J 1/42; G01T 1/18

[52] U.S. Cl. .................................... 250/372; 250/374; 250/385

[58] Field of Search ................... 250/361 R, 366, 372, 250/374, 385; 356/51

[56] References Cited

U.S. PATENT DOCUMENTS

| | | | |
|---|---|---|---|
| 3,786,270 | 1/1974 | Borkowski et al. | 250/374 |
| 4,206,361 | 6/1980 | Hounsfield et al. | 250/366 |
| 4,286,158 | 8/1981 | Charpak et al. | 250/385 |

*Primary Examiner*—Alfred E. Smith
*Assistant Examiner*—Janice A. Howell
*Attorney, Agent, or Firm*—Larson and Taylor

[57] ABSTRACT

A gas scintillation proportional counter, with a photosensitive layer, is coupled, through a UV transparent window, to a multi-anode proportional chamber filled with a gas mixture (for instance an argon triethylamine-methane mixture) having a large quantum efficiency for the UV photons. When detecting incident photons, there is obtained the good efficency of photosensitive layers and the satisfactory two-dimensional coordinate localization of multiwire proportional chambers.

7 Claims, 1 Drawing Figure

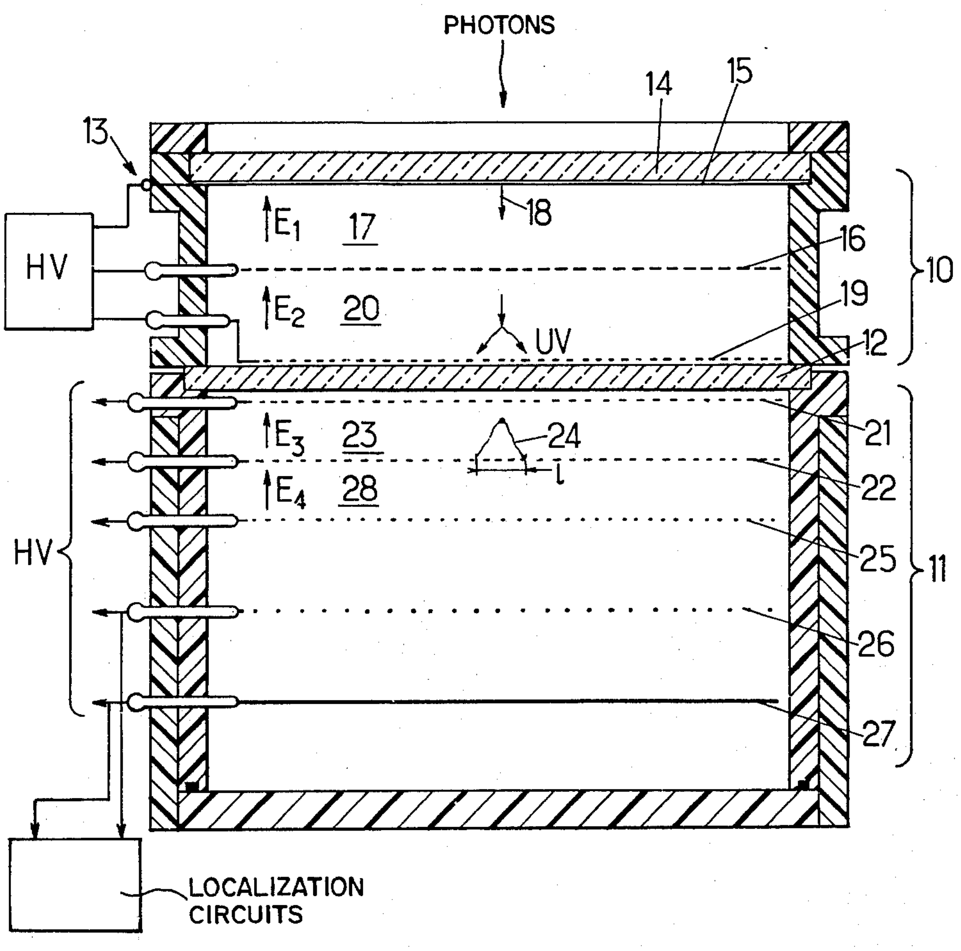
PHOTONS
14
15
13
HV
$E_1$
17
18
16
10
$E_2$
20
19
UV
12
21
$E_3$
23
24
l
22
$E_4$
28
25
HV
11
26
27
LOCALIZATION
CIRCUITS

DETECTION AND IMAGING OF THE SPATIAL DISTRIBUTION OF VISIBLE OR ULTRAVIOLET PHOTONS

The present invention relates to the detection and two-dimensional imaging of incident photons in the visible and ultraviolet range.

Numerous imaging systems for supplying an image of a field of radiation are already known. They are widely used in the laboratory and medical fields.

Scintillation gas proportional counters have been used for detection and localization of neutral radiation, as described for example by A. POLICARPO in "The gas proportional scintillation counter", Space Science Instrum. 3 (1977), 77. A high degree of energy resolution, close to the statistical limit, is obtained over large areas. Since however the largest fraction of the secondary light emission induced by electrons in noble gases such as krypton and xenon is in the far-UV part of the spectrum, combinations of wavelength shifters and matching phototubes should be used for detection. Two-dimensional imaging can be achieved with a plurality of photomultiplier tubes for detecting the same event and providing signals which are processed for localization. A limitation of such systems consists in that they are inherently limited to a single hit per event.

In an attempt to combine the properties of gas scintillation counters with the satisfactory electron localization techniques available with multiwire proportional chambers, it has been suggested to couple a scintillation proportional counter and a photoionization gas detector (POLICARPO, Nucl. Instrum. and Methods 153 (1978) 389.

It is an object of the invention to provide a device which may be operated as an image intensifier.

It is an object of the invention to provide a detector system combining the favourable features of gas scintillation proportional counters, photo-ionization detectors, and photosensitive layers.

A device according to an aspect of the invention for detection and two-dimensional imaging of a field of photons comprises a gas filled scintillating proportional chamber and a proportional counter coupled to the scintillating chamber by a window transparent to the UV radiation from the scintillating proportional chamber. The gas filled scintillating proportional chamber has an enclosure provided with an input window transparent to the radiation to be detected and internally coated with a layer of photosensitive electron emitting material constituting a photocathode.

Suitable electrodes extract the photoelectrons from said layer and give them the additional energy necessary to produce the VUV (Vacuum Ultra-Violet) photons which will be further used for localization and detection.

The proportional counter comprises an enclosure filled with a gas in which the photons received from the scintillating proportional chamber generate electron avalanche events which are detected and localized by conventional methods. The proportional counter may typically operate as a multiwire proportional counter. The gas filling will be selected in dependence on the wavelength of the UV light generated in the gas filled scintillating proportional chamber.

Other features and advantages of the invention will appear from a consideration of the following description of a particular embodiment of the invention.

SHORT DESCRIPTION OF THE DRAWING

The single FIGURE is a schematic diagram of a particular embodiment of a device for detection and two-dimensional imaging of a field of visible and ultraviolet photons according to the present invention.

DETAILED DESCRIPTION

Referring to the single FIGURE, the essential components of a device arranged to detect visible and ultraviolet photons from a source are shown in diagrammatic form.

The device may be considered as comprising a gas filled scintillating proportional chamber 10 and a proportional counter 11 coupled to the scintillating chamber by a window 12. It comprises a lateral wall 13 of electrically insulating material, for instance made from rings of fiber glass reinforced resin. The rings are connected to each other by conventional means (not shown) to constitute a unitary structure. Conventional sealing means (not shown) are located between the rings. For more clarity, no attempt has been made to represent the components at scale. The scintillating proportional chamber has an input window 14 of a material which is transparent to the photons to be detected and which is internally coated with a layer 15 of electron emitting light sensitive material. The input window and the associated layer, which constitutes a transparent photo-cathode, have a structure quite similar to the input window of a photomultiplier tube. It may consequently be constituted with such a window, which is currently available in the trade. Input window 14 and output window 12 define, with the lateral wall 13, an enclosure which is filled with a gas adapted to convert the photo-electrons from photo-cathode 15 into photons in the UV part of the spectrum, without any gaseous amplification. The gas will essentially consist of a noble gas, typically krypton, which may be under atmospheric pressure, thereby avoiding pressure forces on the enclosure. Since the gas in the scintillating proportional chamber may be highly pure krypton, it will have no detrimental effect on the photo-cathode material, on which a gas of the type used in most proportional counters would have a detrimental effect resulting in fast destruction. Since operation will be under conditions such that there is no gas charge amplification, and consequently no creation of positive ions, the risk of destruction of the photo-cathode by such ions is removed as well as the risk of extraction of secondary electrons from the photo-cathode by these ions.

A plurality of grid electrodes are located in the enclosure of the scintillating proportional chamber in parallel relation with the input and output windows 14 and 12. They are connected to outside sources through air tight connectors projecting through lateral wall 13 and maintained at potentials creating appropriate fields in the enclosure.

As illustrated, the grid electrodes comprise a first electrode 16 located at a distance from window 14 which may be selected in a large range since its value has no substantial effect on the operation of the device. Grid 16 is at a potential which generates an electric field $E_1$ in space 17 between grid 16 and photo-cathode 15 selected to drift the photo-electrons such as 18 toward grid 16. The value of field $E_1$ may typically be of about 2 KV per centimeter. The grid should consist of a wire which is fine enough for being transparent to the photo-electrons, whereby said photo-electrons may enter a second space 20, defined by grid 16 and an additional grid 19. The voltages of grids 16 and 19 are such that a field $E_2$ substantially stronger than field $E_1$ prevails in space 20. Field $E_2$ has a value which is typically of about 4 KV per centimeter and the width of space 20 may be some millimeters, typically 5 millimeters.

Electric field $E_2$ is selected for the photo-electrons 18 to provide an excitation of the atoms of the noble gas, but low enough for avoiding substantial electron multiplication due to ionization. However, a small amount of multiplication may be accepted, if sufficiently low, since most ions may be absorbed by grid 16.

Feedback of UV photons on the photocathode is likely to occur and should be avoided. That return may be avoided by a number of approaches:

a small proportion of UV absorbing gas, to which the photo-cathode is insensitive, e.g. $CO_2$, may be added to the atmosphere in the chamber. The proportion of absorbing gas should be selected for it to absorb a negligible proportion of the UV photons travelling through space 20 and to drastically absorb the photons through space 7 which can be about 10 times thicker than space 20.

grid 16 can be constructed as a venetian blind, which is highly transparent to photo-electrons, but is opaque to photons.

the voltage applied to grid 16 can be pulsed to switch off field $E_1$ after detection of the first photons by the proportional counter 11. The necessary time delay can be provided by selecting space 17 large enough.

The arrangement of electrodes 16 and 19 as described above is quite similar to that disclosed in prior art documents, particularly French Patent Application No. 77 36893, (U.S. Pat No. 4,286,158), and provides the same favorable results, namely production of photons in the far UV field. However, there are two substantial differences with the prior art. A first difference consists in that the electrons which act as a relay between the incident photons and the resulting UV photons originate from a photo-cathode. Another substantial difference resides in that the UV photons are not collected on a layer of wavelength shifting material for viewing by an array of photomultiplier tubes. The output window 12 of chamber 10 is of a material which is transparent to the UV photons created in space 20. The material of window 12 may typically be lithium floride if the gas in chamber 10 is krypton, which delivers UV photons in a broad spectrum centered around 8.5 eV.

Localization of the UV photons is carried out in a proportional counter which receives the photons through window 12. A large variety of proportional counters may be used, of the well known types which provide avalanche localization with a precision which may easily be of about 200 microns. Counter 11 will operate under favorable conditions, since a krypton filled space 20 of about 5 millimeter is sufficient for providing about 100 U.V. photons per electron which enters space 20.

Counter 11 will consist of an enclosure filled with a gas mixture whose main constituent is argon, with a photo-ionizable compound and an additive, such as $C_2H_6$, which has no substantial absorption in the UV spectrum and which enhances proportional gas amplification. A yield of about 20% is obtained with triethylamine (TEA) in an amount of some percent in the enclosure. The gas mixture will preferably be under atmospheric pressure to balance the forces on output window 12 and avoiding pressure forces on the lateral wall.

Referring again to FIG. 1, there is illustrated an embodiment of counter 11 whose structure is more complex than necessary, but which appears preferable. A plurality of parallel grids are located in chamber 11 and define successive spaces. A first space 23 is defined by a third grid 21, placed against window 12 which should have a large void coefficient for being transparent to UV photons, and a fourth grid 22. A high voltage source (not shown) is connected to grids 21 and 22 to establish an electric field $E_3$ in space 23. That field is of such value that the photo-electrons produced by the UV photons in space 23 are subjected to an avalanche process, as schematized at 24. The electrons develop as a cloud and have a width l where they reach grid 22. The other grids constitute the electrodes of a multiwire proportional counter for localizing the centroid of the electron cloud resulting from the avalanche process. They include a cathode 25 which is sufficiently transparent for transfer of electrons without substantial loss and a second cathode 27 consisting of wires extending in a direction orthogonal to that of the wires constituting cathode 25 unless the latter consists of a grid of crossed wires.

Cathode 25 is at a distance from grid 22 and at a potential selected for the field $E_4$ between 22 and 25 to be substantially lower than the field $E_3$ in space 23, for instance 0.2 $E_3$. It was found that, with a space 23 3 mm wide where the field $E_3$ is 10 KV per centimeter and a transfer space 28 where the field is about 2 KV per centimeter, about 20% of the electrons, originating from the avalanche are transferred to the multiwire proportional counter. That proportion of the electrons, which may be as high as thousand electrons per incident photon, is received through grid 25. The anode 26 will typically consist of fine wires, typically of 20 microns diameter at a spacing of 2 millimeters. That anode 26 is separated by the same distance, typically about 6 millimeters, from cathode 25 and the other cathode 27 which may consist of larger wire whose diameter is typically of about hundred microns.

Cathodes 25 and 27 are associated with a conventional circuitry for determining the centroid of the avalanche by a process which may for instance be digital scrutation on each wire, use of a delay line, current division, etc. Since the avalanche has a lateral width l which distributes the charges on a number of anode wires larger than 1 and conventional analog methods lend to interpolation, the centroid may be located with a precision which is about one tenth of the spacing between two adjacent anode wires. The precision may consequently be as high as 200 microns or less.

It is felt unnecessary to describe such localization methods in full detail. Reference may be made to prior documents, for instance copending U.S. patent application 133,094 (CHARPAK), now U.S. Pat. No. 4,317,038.

The device has the application of conventional imaging high intensifiers with the advantage of possible large area and great localization accuracy. It may be associated with a collimator of conventional design located before the input window. Whatever the embodiment, it will be appreciated that the device has substantial advantages over those previously known. Since the scintillating proportional chamber is filled with an inert gas only, there is no detrimental action on the photocathode. The proportional counter is of a type which is proven and provides a high degree of precision. Since the device is filled with gas under atmospheric pressure, the windows may have a very high surface, which may easily reach 1 $m^2$. High degrees of energy and spatial resolution can be obtained over large areas of detection. Stability of operation is also obtained, since the device does not include wavelength shifter material. The device may operate in magnetic fields and is suitable for background rejection techniques. The electronic circuits associated with the electrodes of the counter may provide a high degree of energy resolution due to its association with a gas scintillation chamber.

We claim:

1. A device for detection and two-dimensional localization of a field of visible and ultraviolet photons, comprising:

a first noble gas-filled enclosure defined by a lateral wall, a radiation input window and an output window, a photo-cathode layer on the inner surface of said window selected to deliver photo-electrons in response to photons, electrode means in said first enclosure to create an electrical field transverse to said input window of a value which imparts additional energy to said photo-electrons and causes far UV production in response to said photo-electrons, without substantial electron multiplication, and a second enclosure separated from said first enclosure by said output window of a material transparent to said UV photons, a gas mixture including noble gas and an easily ionizable compound in said second enclosure, a plurality of electrodes in said second enclosure, and circuit means associated with said electrodes for applying voltages to said electrodes selected for causing avalanche processes to occur in said gas mixture responsive to said far UV photons, whereby said enclosure and electrodes constitute a proportional counter for determining the location of said far UV photons.

2. A device according to claim 1, wherein said noble gas is krypton and said output window is of lithium fluoride.

3. A device according to claim 1, wherein the electrode means in said first enclosure comprise first and second grid electrodes parallel to said input window and wherein an electrical source is connected to said photo-cathode layer, first electrode and second electrode to establish an electric field between the layer and first electrode of such intensity and direction that photo-electrons from said photo-cathode are drifted toward said first electrode into a space between said first and second electrode where prevails the electric field which causes UV photon production.

4. A device according to claim 1, 2 or 3, wherein said means in said second enclosure comprises multiwire cathode and anode electrodes associated with a circuitry for determining the two-dimensional location and energy of the UV photons.

5. A device according to claim 3, wherein said second enclosure further includes a conversion space located between said output window and said electrodes for determining the location of the UV photons for conversion of said UV photons into electron avalanche clouds.

6. A device according to claim 5, wherein said gas mixture in said second enclosure has at least one component whose ionization potential is lower than the energy of part at least of the UV photons traversing said output window.

7. A device according to claim 5 or 6, wherein the pressure in said enclosures is close to atmospheric pressure.

* * * * *